United States Patent
Haussmann et al.

(10) Patent No.: US 11,724,610 B2
(45) Date of Patent: Aug. 15, 2023

(54) CIRCUIT ARRANGEMENT FOR A MOTOR VEHICLE, IN PARTICULAR FOR A HYBRID OR ELECTRIC VEHICLE

(71) Applicant: Daimler AG, Stuttgart (DE)

(72) Inventors: Moritz Haussmann, Nuertingen (DE); Christian Kloeffer, Sinzheim (DE); Jan Philipp Degel, Karlsruhe (DE); Joerg Weigold, Stuttgart (DE); Urs Boehme, Ehningen (DE); Stefan Haehnlein, Lauda-Koenigshofen (DE)

(73) Assignee: Daimler AG, Stuttgart (DE)

( * ) Notice: Subject to any disclaimer, the term of this patent is extended or adjusted under 35 U.S.C. 154(b) by 271 days.

(21) Appl. No.: 17/312,128

(22) PCT Filed: Dec. 10, 2019

(86) PCT No.: PCT/EP2019/084368
§ 371 (c)(1),
(2) Date: Jun. 9, 2021

(87) PCT Pub. No.: WO2020/120446
PCT Pub. Date: Jun. 18, 2020

(65) Prior Publication Data
US 2022/0032798 A1 Feb. 3, 2022

(30) Foreign Application Priority Data
Dec. 14, 2018 (DE) ................... 10 2018 009 848.7

(51) Int. Cl.
*B60L 53/22* (2019.01)
*B60L 53/14* (2019.01)
(Continued)

(52) U.S. Cl.
CPC ............. *B60L 53/22* (2019.02); *B60L 15/007* (2013.01); *B60L 53/14* (2019.02); *H02J 7/0045* (2013.01);
(Continued)

(58) Field of Classification Search
CPC ........ B60L 53/22; B60L 15/007; B60L 53/14; B60L 50/51; B60L 2210/40;
(Continued)

(56) References Cited

U.S. PATENT DOCUMENTS 10,632,859 B2 * 4/2020 Beulich ................... B60L 58/40
2016/0332616 A1 * 11/2016 Zhao ..................... B60W 10/08
(Continued)

FOREIGN PATENT DOCUMENTS

DE 10 2012 202 764 A1 8/2013
DE 10 2015 008 175 A1 1/2016
(Continued)

OTHER PUBLICATIONS

PCT/EP2019/084368, International Search Report dated Mar. 13, 2020 (Two (2) pages).
(Continued)

*Primary Examiner* — Rexford N Barnie
*Assistant Examiner* — Swarna N Chowdhuri
(74) *Attorney, Agent, or Firm* — Crowell & Moring LLP

(57) ABSTRACT

A circuit arrangement of a motor vehicle includes a high-voltage battery for storing electrical energy, an electric machine for driving the motor vehicle, a converter via which high-voltage direct current voltage provided by the high-voltage battery is convertible into high-voltage alternating current voltage for operating the electric machine, and a charging connection for providing electrical energy for charging the high-voltage battery. The converter is a three-stage converter having a first switch unit which is assigned (Continued)

to a first phase of the electric machine. The first switch unit has two switch groups connected in series which each have two insulated-gate bipolar transistors (IGBTs) connected in series, where a connection is disposed between the IGBTs of one of the two switch groups, which connection is electrically connected directly to a line of the charging connection.

8 Claims, 4 Drawing Sheets

(51) Int. Cl.
| | |
|---|---|
| *H02J 7/00* | (2006.01) |
| *B60L 15/00* | (2006.01) |
| *H02M 7/487* | (2007.01) |
| *H02M 7/5387* | (2007.01) |
| *H02P 27/06* | (2006.01) |
| *B60L 50/51* | (2019.01) |
| *B60K 6/26* | (2007.10) |
| *B60K 6/28* | (2007.10) |

(52) U.S. Cl.
CPC ......... *H02M 7/487* (2013.01); *H02M 7/5387* (2013.01); *H02P 27/06* (2013.01); *B60K 6/26* (2013.01); *B60K 6/28* (2013.01); *B60L 50/51* (2019.02); *B60L 2210/40* (2013.01); *B60Y 2200/91* (2013.01); *B60Y 2200/92* (2013.01); *B60Y 2400/61* (2013.01)

(58) Field of Classification Search
CPC ...... B60L 2210/30; B60L 53/11; B60L 53/24; H02J 7/0045; H02M 7/487; H02M 7/5387; H02M 7/797; H02P 27/06; B60K 6/26; B60K 6/28; B60Y 2200/91; B60Y 2200/92; B60Y 2400/61; Y02T 10/64; Y02T 10/70; Y02T 10/72; Y02T 90/14; Y02T 10/7072; Y02T 10/92
USPC ........................................................ 307/10.1
See application file for complete search history.

(56) References Cited

U.S. PATENT DOCUMENTS

| | | | | |
|---|---|---|---|---|
| 2020/0321797 | A1* | 10/2020 | Gerrits | .................... B60L 53/52 |
| 2021/0046830 | A1* | 2/2021 | Bode | ...................... H02J 7/0047 |
| 2022/0017029 | A1* | 1/2022 | Trinkner | ................. B66C 23/44 |

FOREIGN PATENT DOCUMENTS

| | | |
|---|---|---|
| DE | 10 2014 220 834 A1 | 4/2016 |
| DE | 10 2015 225 574 A1 | 6/2017 |
| DE | 10 2016 015 311 A1 | 7/2017 |
| DE | 10 2016 218 304 B3 | 2/2018 |
| EP | 2 514 627 A1 | 10/2012 |

OTHER PUBLICATIONS

German Search Report issued in German application No. 10 2018 009 848.7 dated Aug. 27, 2019, with Statement of Relevancy (Ten (10) pages).

German-language European Office Action issued in European application No. 19 828 226.1-1012 dated Jan. 4, 2023 (Four (4) pages).

* cited by examiner

CIRCUIT ARRANGEMENT FOR A MOTOR VEHICLE, IN PARTICULAR FOR A HYBRID OR ELECTRIC VEHICLE

BACKGROUND AND SUMMARY OF THE INVENTION

The invention relates to a circuit arrangement for a motor vehicle, in particular for a hybrid or electric vehicle.

Such circuit arrangements for motor vehicles, in particular for hybrid or electric vehicles, are already sufficiently known from the general prior art. The circuit arrangement has a high-voltage battery for storing electrical energy or electrical current. The circuit arrangement also has at least one electric machine for driving the motor vehicle, in particular electrically. In addition, a converter is provided, by means of which high-voltage DC voltage, which can be or is provided by the high-voltage battery, can be converted into high-voltage AC voltage for operating the electric machine. In other words, the electric machine can be operated with the high-voltage AC voltage resulting from the high-voltage DC voltage by the converter converting the high-voltage DC voltage into the high-voltage AC voltage. Furthermore, the circuit arrangement comprises a charging connector for providing electrical energy to charge the high-voltage battery. In other words, the high-voltage battery can be charged with electrical energy provided by the charging connection.

In addition, DE 10 2015 008 175 A1 discloses a circuit arrangement for charging a high-voltage battery in a motor vehicle, having a high-voltage battery bank which has a series circuit of battery cells electrically coupled between two load connection poles of a two-pole load connection, wherein a first high-voltage DC voltage can be provided at the load connection by means of the high-voltage battery bank.

DE 10 2016 218 304 A1 also shows a device for voltage conversion having an inverter which has three half-bridges having four transistors each. The device is also connected to a traction motor, a battery, a control device and a charging connection, and can be used in a method for charging the battery by means of an external DC voltage source.

The object of the present invention is to develop a circuit arrangement of the type mentioned in the introduction in such a way that the high-voltage battery can be charged in a particularly advantageous manner.

In order to be able to charge the high-voltage battery in a particularly advantageous manner, the converter is designed as a three-stage converter. In this case, the converter has at least one switch unit which is assigned, in particular precisely, to one phase of the, for example, multi-phase, in particular three-phase, electric machine. This means that the switch unit is or can be electrically connected to the phase to which the switch unit is assigned. In this way, for example, the phase can be supplied with electrical energy via the switch unit assigned to the phase, or with a high-voltage AC voltage resulting from the high-voltage DC voltage that can be or is provided by the high-voltage battery, which high-voltage AC voltage can be or is provided by the converter.

The switch unit has two switch groups connected in series to each other. The respective switch group has two IGBTs connected in series to each other. As is already sufficiently known from the general prior art, the IGBT is an insulated-gate bipolar transistor having an insulated gate electrode.

A connection, which is also referred to as a tap, is arranged between the two IGBTs of one of the switch groups, the connection being electrically connected directly to a line of the charging connection. The line can be flowed through by the electrical energy which is or can be provided by the charging connection for charging the high-voltage battery. In other words, the electrical energy provided by the charging connection and used for charging the high-voltage battery can run or flow through the line.

By way of example, the converter has a first switching state, a second switching state and a third switching state, such that the converter can be switched between the first switching state, the second switching state and the third switching state. In addition, the high-voltage battery, which is simply also referred to as a battery, has, for example, at least one first battery segment and at least one second battery segment, wherein the battery segments are or can be connected in series to each other, for example. By means of the first battery segment, for example, a first high-voltage DC voltage can be provided, wherein, for example, by means of the second battery segment, a second high-voltage DC voltage can be provided.

In the first switching state, the first battery segment of the high-voltage battery is electrically connected or coupled to the charging connection via the three-stage converter, while the second battery segment is decoupled from the charging connection by means of the converter. As a result, the first battery segment can be charged via the three-stage converter with electrical energy provided by the charging connection.

In the second switching state, the second battery segment of the high-voltage battery is electrically connected or coupled to the charging connection via the three-stage converter, while the first battery segment of the high-voltage battery is decoupled from the charging connection by means of the converter. In this way, the second battery segment can be charged via the three-stage converter with electrical energy provided by the charging connection. Finally, in the third switching state, both the first battery segment and the second battery segment of the high-voltage battery are electrically connected to the charging connection via the three-stage converter, such that both the first battery segment and the second battery segment can be charged via the three-stage converter with electrical energy provided by the charging connection.

The charging connection can, for example, be electrically connected to an external energy source with respect to the motor vehicle, such as a so-called charging column, for example, in particular a DC voltage charging column also referred to as a direct current charging column. In this way, an electrical voltage provided by the energy source and, for example, in the form of a high voltage, in particular electrical DC voltage and preferably an electrical high-voltage DC voltage, can be transmitted from the external energy source to the charging connection and subsequently provided by the charging connection. In other words, the energy source can provide electrical energy that can be transferred to the charging connection and thus provided by the charging connection. As a result, the high-voltage battery can be charged via the charging connection with the electrical energy provided by the external energy source. The three-stage converter provided in accordance with the invention makes it possible in this case, in particular depending on the electrical voltage provided by the energy source, to optionally electrically connect the first battery segment, the second battery segment or both the first battery segment and the second battery segment to the charging connection and thus to charge them with the electrical energy provided by the energy source.

By way of example, if the electrical energy provided by the energy source has an electrical voltage corresponding to the high-voltage DC voltage of the high-voltage battery, the third switching state is set. As a result, the first battery segment and the second battery segment, in particular the entire high-voltage battery, are electrically connected to the charging connection, such that the first battery segment and the second battery segment, in particular the entire high-voltage battery, can be charged simultaneously with the electrical energy provided by the charging connection or via the charging connection from the power source.

By way of example, if the electrical energy provided by the energy source has an electrical voltage that is a high electrical voltage but lower than the high voltage DC voltage of the high-voltage battery, the first switching state or the second switching state is set. As a result, the first battery segment or the second battery segment can be charged via the three-stage converter with the electrical energy provided from the power source via the charging connection. Preferably, during a charging process in which the battery segments or the high-voltage battery are charged with the electrical energy provided by the energy source via the charging connection, the first switching state is initially set, for example during a first part of the charging process. During a second charging process temporally following, for example, the first part of the charging process, the second switching state is set, for example. In particular, it can be provided that the first switching state and the second switching state alternate several times during the charging process. During the respective first part, the first battery segment is charged via the three-stage converter, and during the respective second part, the second battery segment is charged via the three-stage converter. As a result, during the charging process, the battery segments are charged sequentially, and alternating several times, for example, such that the high-voltage battery is charged as a whole during the charging process. By way of example, while the first battery segment is being charged, the second battery segment is not being charged, and while the second battery segment is being charged, for example, the first battery segment is not being charged. This makes it possible to charge the high-voltage battery advantageously as a whole, even though the electrical voltage of the electrical energy provided by the energy source is lower than the high-voltage DC voltage of the high-voltage battery.

In the context of the invention, the high-voltage DC voltage, the high-voltage AC voltage and the aforementioned high voltage are generally understood to mean an electrical voltage which is greater than 50 volts, in particular greater than 60 volts. Preferably, the high voltage, the high-voltage DC voltage or the high-voltage AC voltage is several hundred volts. By way of example, the high-voltage DC voltages of the battery segments add up to the high-voltage DC voltage of the high-voltage battery as a whole. Preferably, for example, the respective high-voltage DC voltage of the respective battery segment is 400 volts, wherein it is preferably provided that the high-voltage DC voltage of the battery segments is the same. Thus, preferably, the high-voltage DC voltage of the high-voltage battery is 800 volts.

The three-stage converter used in accordance with the invention makes it possible to charge the high-voltage battery both by means of such a charging infrastructure, which can provide electrical energy with 800 volts DC, and by means of such a charging infrastructure, which can provide electrical energy with 400 volts DC.

Furthermore, the three-stage inverter has a dual function. A first function of the three-stage converter comprises that the high-voltage battery can be charged via the three-stage converter in the manner described. By way of example, the battery segments can each be charged individually or separately from one another via an intermediate voltage tap provided between them, in particular in the first switching state and in the second switching state. In the third switching state, the battery segments can be charged simultaneously or together. A second function of the three-stage converter comprises that the electric machine, which can be operated, for example, in an engine mode and thus as an electric engine for electrically driving the motor vehicle, can be supplied with high-voltage AC voltage via the three-stage converter and can be operated by means of the high-voltage AC voltage. For this purpose, the three-stage converter, for example in a fourth switching state, converts the high-voltage DC voltage of the high-voltage battery provided by the high-voltage battery into the aforementioned high-voltage AC voltage, which is provided by the three-stage converter, in particular in the fourth switching state. Thus, for example, the three-stage converter operates in the fourth switching state as a three-stage inverter. The electric machine, in particular in the fourth switching state, can be or is supplied with the high-voltage AC voltage provided by the three-stage converter, as a result of which the electric machine, in particular as an electric engine, can be or is operated. This dual function of the three-stage converter makes it possible to keep the number of parts and the weight and costs of the circuit arrangement and thus of the motor vehicle as a whole particularly low.

Further advantages, features and details of the invention emerge from the following description of a preferred exemplary embodiment and from the drawings. The features and combinations of features mentioned above in the description, as well as the features and combinations of features mentioned below in the description of figures and/or shown in the figures alone, can be used not only in the combination specified in each case, but also in other combinations or on their own, without departing from the scope of the invention.

DETAILED DESCRIPTION OF THE DRAWINGS

Figure 1:
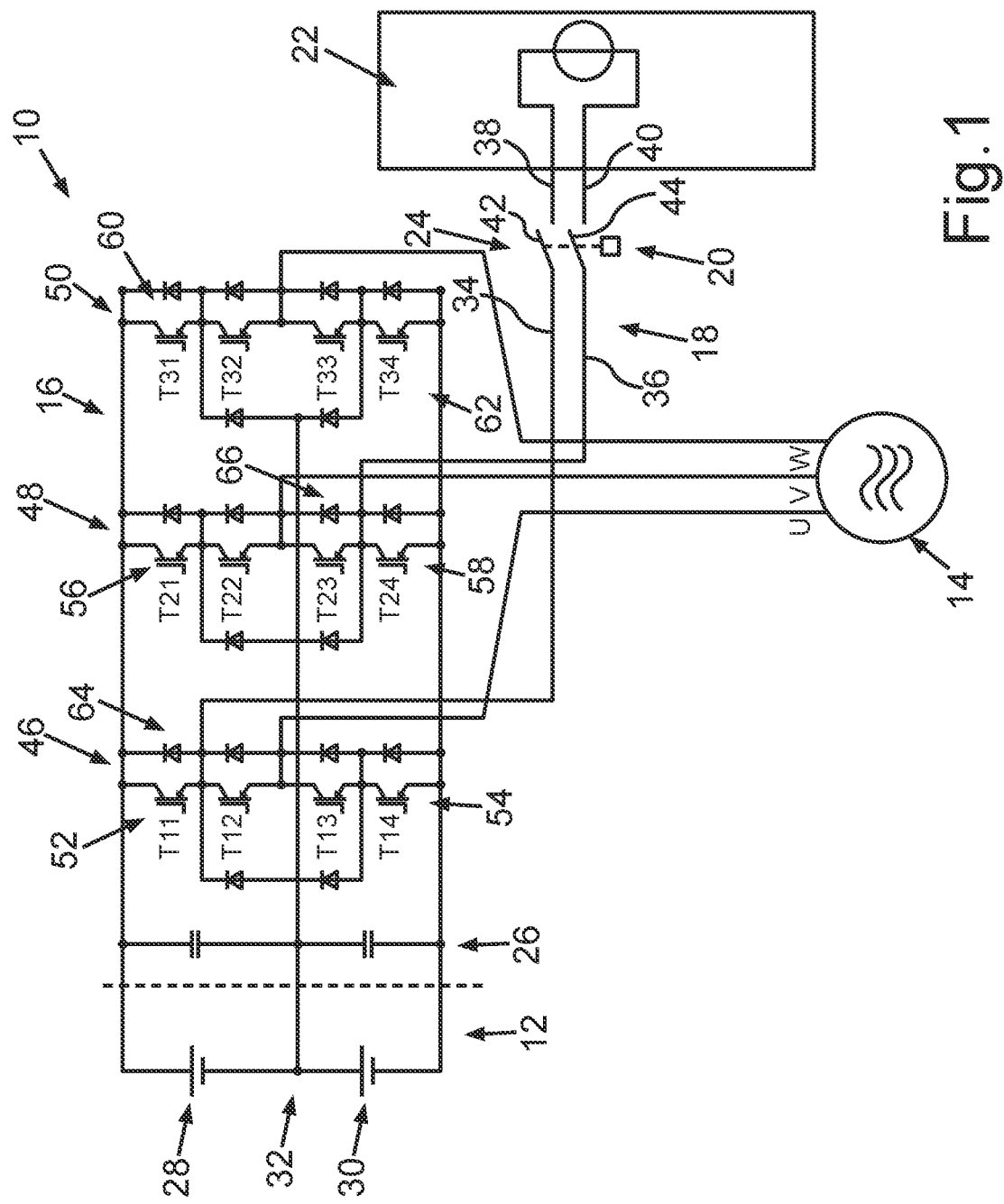
FIG. 1 is a schematic depiction of a circuit arrangement according to the invention for a motor vehicle designed, for example, as a hybrid or electric vehicle.

In the figures, identical or functionally identical elements are provided with the same reference numerals.

FIG. 1 shows a schematic depiction of a circuit arrangement 10 for a motor vehicle. This means that the motor vehicle in its fully manufactured state has the circuit arrangement 10. The motor vehicle is designed, for example, as a hybrid or preferably electric vehicle, in particular as a battery-electric vehicle. The circuit arrangement 10 has a high-voltage battery 12 for storing electrical energy or electrical current, which is depicted particularly schematically in FIG. 1 and is also simply referred to as a battery. In addition, the circuit arrangement comprises at least one electric machine 14, which has, in particular precisely, three phases u, v and w. The electric machine 14 can be operated, for example, in an engine mode and thus as an electric engine. In order to operate the electric machine 14 in the engine mode, the electric machine 14 is supplied with an electric alternating voltage, in particular an electric high-voltage alternating voltage, via the phases u, v and w, in particular via phase lines or phase connection associated with the phases u, v and w.

The circuit arrangement 10 further comprises a converter 16, by means of which high-voltage DC voltage which can be or is provided by the high-voltage battery 12 can be converted into high-voltage AC voltage for operating the electric machine 14. In other words, the high-voltage battery 12 has a high-voltage DC voltage which is, for example, 800 volts. This means that the high-voltage battery 12 can provide the high-voltage DC voltage. In at least one switching state of the converter 16, the converter 16 converts the high-voltage DC voltage provided by the high-voltage battery 12 into high-voltage AC voltage provided by the converter 16. The high-voltage AC voltage provided by the converter 16 can be supplied to the electric machine 14, in particular via the phase lines, such that the electric machine 14, in particular the phase lines, can be supplied or is supplied with the high-voltage AC voltage provided by the converter 16. As a result, the electric machine 14 is operated as an electric engine by means of the high-voltage AC voltage provided by the converter 16 and thus in the engine mode. As a result, the motor vehicle can be electrically driven by means of the electric engine.

The circuit arrangement 10 has a charging connection 20. The charging connection 20 can provide electrical energy, in particular with a high-voltage DC voltage, wherein the high-voltage battery 12 can be charged with the electrical energy provided by the charging connection 20. This means that the electrical energy provided by the charging connection 20 can be fed into the high-voltage battery 12 and thus stored in the battery.

FIG. 1 also shows, particularly schematically, an energy source external to the motor vehicle and thus external to the circuit arrangement 10 and provided in addition thereto, presently in the form of a charging column 22. The charging column 22 can provide electrical energy with which the high-voltage battery 12 can be charged. For this purpose, the charging column 22 can be electrically connected to the charging connection 20. As a result, the electrical energy provided by the charging column 22 can be transferred to the charging connection 20 and provided by the charging connection 20, such that the electrical energy provided by the charging column 22 can be transferred to the high-voltage battery 12 via the charging connection 20. As a result, the electrical energy provided by the charging station 22 can be stored in the battery.

The charging connection 20 has a line arrangement 18 having a first line 34 and a second line 36, through which the electrical energy that can be or is provided by the charging connection 20 can flow. In other words, the electrical energy provided by the charging column 22 and used to charge the battery can run or flow through the lines 34 and 36.

The charging connection 20 also has a first contact 38 electrically connected to the line 34 and a second contact 40 electrically connected to the line 36, to which the charging column 22 is electrically connectable. Thus, the electrical energy provided by the charging column 22 can be transmitted to the contacts 38, 40 and fed into the lines 34 and 36 and the charging connection 20 via the contacts 38, 40. The lines 34 and 36 and thus the charging connection 20 are thereby electrically connected to the converter 16. Thereby, an optionally provided contactor 24 is arranged in the line arrangement 18, which comprises two switches 42 and 44. The switch 42 is arranged in the line 34 and the switch 44 is arranged in the line 36. The respective switch 42 or 44 is switchable between a respective open state and a respective closed state. If, for example, the switch 42 is in its open state, the line 34 is interrupted such that the contact 38 is decoupled or disconnected, in particular electrically isolated, from the converter 16. If the switch 42 is closed, the line 34 is closed, such that the contact 38 is electrically connected to the converter 16. If the switch 44 is in its open state, the line 36 is interrupted, whereby the contact 40 is decoupled or separated, in particular electrically isolated, from the converter 16. However, if the switch 44 is in its closed state, the line 36 is closed, whereby the contact 40 is electrically connected to the converter 16. By using the contactor 24, a particularly safe operation can be implemented.

In order to be able to charge the battery in a particularly advantageous manner, the converter is designed as a three-stage converter, wherein the converter 16 has, in particular precisely, three switch units 46, 48 and 50. The switch unit 46 is assigned to the phase u, wherein the switch unit 48 is assigned to the phase v, and the switch unit 50 is assigned to the phase w of the electric machine 14. The electric machine 14 is thus designed as a multiphase, in particular as a three-phase, electric machine. In the exemplary embodiment illustrated in FIG. 1, the switch unit 46 is electrically connected or connectable to the phase u, wherein the switch unit 48 is electrically connected or connectable to the phase v, and the switch unit 50 is electrically connected or connectable to the phase w.

The respective switch unit 46, 48 or 50 has, in particular precisely, two switch groups 52 and 54 or 56 and 58 or 60 and 62 connected in series. The switch group 52 has, in particular precisely, two IGBTs T11 and T12 connected in series. Furthermore, the switch group 54 has, in particular precisely, two IGBTs T13 and T14 connected in series, wherein the switch groups 52 and 54 are connected in series to each other. The switch group 56 has two, in particular precisely two, IGBTs T21 and T22 connected in series to each other, and the switch group 58 has, in particular precisely, two IGBTs T23 and T24 connected in series to each other. The switch group 60 has, in particular precisely, two IGBTs T31 and T32 connected in series to each other, and the switch group 62 has, in particular precisely, two IGBTs T33 and T34 connected in series to each other.

A first connection 64, also referred to as a first tap, is arranged between the IGBTs T11 and T12 of the switch group 52, which is electrically connected directly to the line 34 of the charging connection 20. Here, a second connection 66, also referred to as a second tap, is arranged between the IGBTs T23 and T24 of the switch group 58, which is directly electrically connected to the line 36 of the charging connection 20. Compared to conventional three-stage converters, the connections 64 and 66 are additionally provided connections, wherein these additional connections 64 and 66 are directly connected to the charging connection 20. Additional separating elements are not required and are not provided.

The high-voltage battery 12 has at least two battery segments 28 and 30, which are connected to each other in series, for example. In order to be able to charge the battery particularly advantageously, the converter 16 is designed as a three-stage converter. The three-stage converter is also referred to as a three-level inverter, which is integrated in the motor vehicle, for example. The converter 16 comprises individual IGBTs T11, T12, T13, T14, T21, T22, T23, T24, T31, T32, T33 and T34 (IGBT—insulated-gate bipolar transistor). As will be further explained below, the use of the three-stage converter makes it possible to charge the battery, in particular via the intermediate circuit 26, both by means of those charging columns which provide electrical energy with a high-voltage DC voltage of 800 volts, and by means of those charging columns which provide electrical energy with a high-voltage DC voltage of 400 volts. In other words, the three-stage converter makes it possible to charge an intermediate circuit voltage of 800 volts with 400-volt charging columns and with 800-volt charging columns.

Typically, drive systems with an intermediate circuit voltage of 400 volts have been used until now in motor vehicles, particularly all-electric motor vehicles, in particular in conjunction with a two-stage converter. However, an intermediate circuit voltage of 800 volts, i.e., a high-voltage DC voltage of 800 volts for the high-voltage battery 12, is particularly advantageous, as it allows particularly high electrical outputs to be implemented for electrical driving.

However, in order to be able to charge such batteries with 800 volts of voltage, in particular intermediate circuit voltage, with an existing charging infrastructure which can provide a maximum of 400 volts DC, an additional voltage converter must be integrated into the motor vehicle or new charging columns are required which provide 800 volts DC. This leads to high costs. The circuit arrangement 10 now makes it possible to charge the high-voltage battery 12, whose high-voltage DC voltage is 800 volts, for example, both by means of charging infrastructures which can provide 800 volts DC voltage and by means of charging infrastructures which can provide a maximum of 400 volts DC voltage.

For this purpose, instead of a two-stage converter, the converter 16 designed as a three-stage converter is used. The converter 16 has a first switching state shown in FIG. 2 or can be operated in the first switching state shown in FIG. 2. By way of example, in the exemplary embodiment illustrated in FIG. 2, the charging column 22 provides electrical energy with a high-voltage DC voltage U1, which is 400 volts. Here, in the first switching state, the battery segment 28 is electrically connected to the charging connection 20 via the converter 16, while the battery segment 30 is decoupled from the charging connection 20, in particular by means of the converter 16. As a result, the battery segment 28 is charged with the electrical energy provided by the charging station 22, while charging of the battery segment 30 is omitted.

Figure 3:
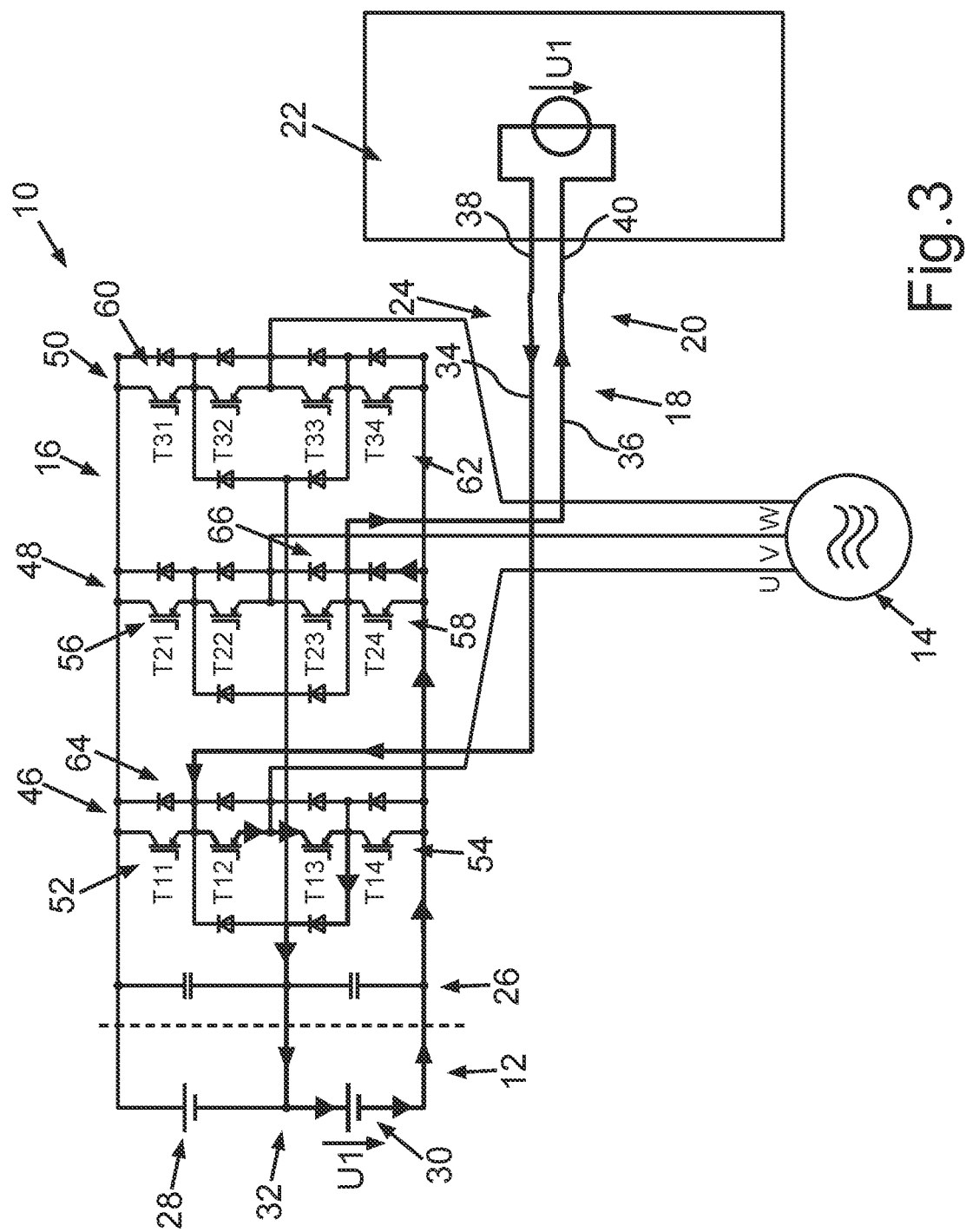
FIG. 3 is a schematic depiction of the circuit arrangement in a second switching state.

The converter 16 further has a second switching state shown in FIG. 3. In the exemplary embodiment shown in FIG. 3, the charging column 22 also provides the electrical energy with the high-voltage DC voltage U1, which is 400 volts. In the second switching state, however, the battery segment 30 is electrically connected to the charging connection 20 via the converter 16, while the battery segment 28 is separated, in particular electrically isolated, or decoupled from the charging connection 20, in particular by means of the converter 16. As a result, the battery segment 30 is charged with the electrical energy provided by the charging column 22.

Figure 4:
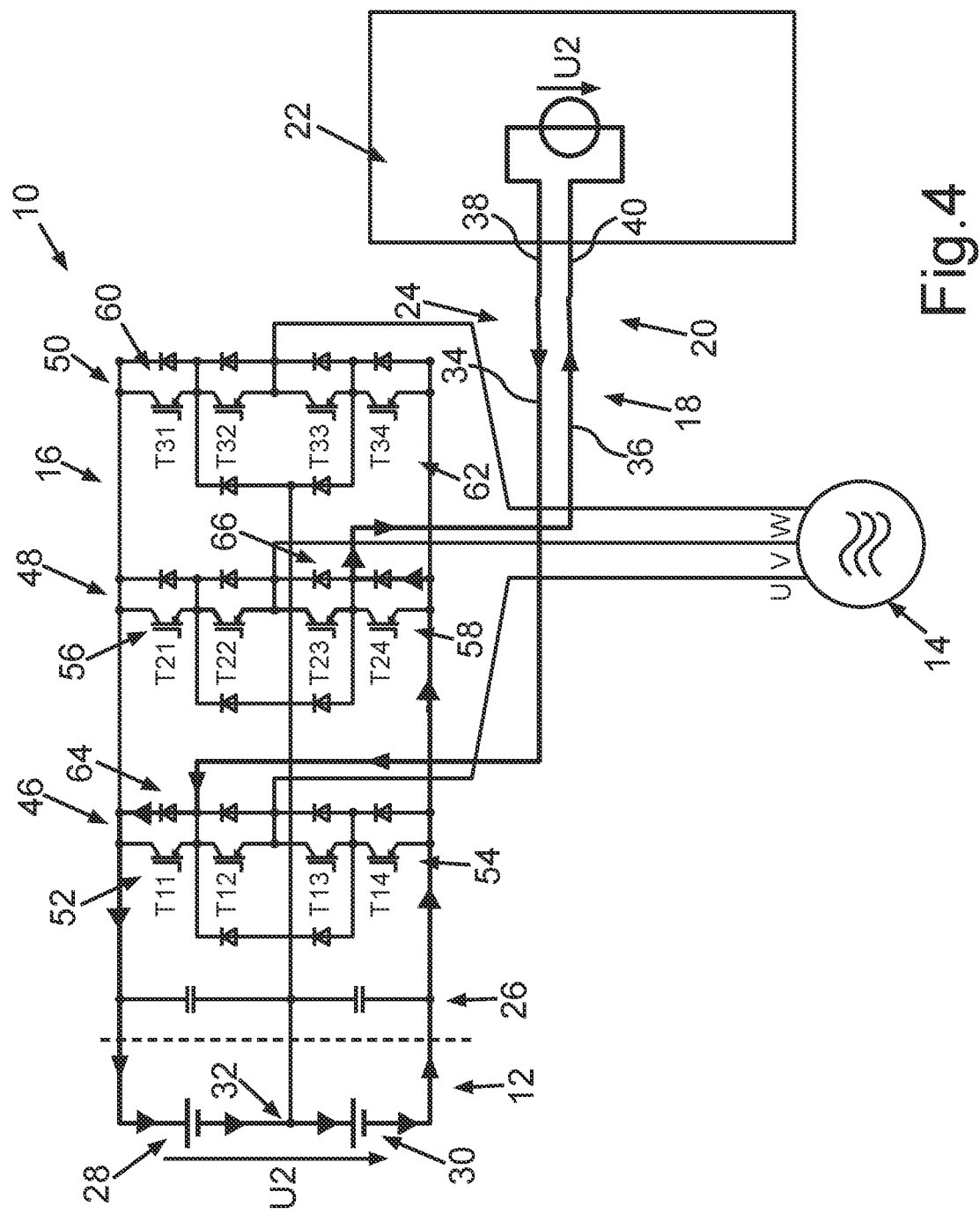
FIG. 4 is a schematic depiction of the circuit arrangement in a third switching state.

FIG. 4 shows an exemplary embodiment, in which the charging column 22 provides electrical energy with a high-voltage DC voltage U2. The high-voltage DC voltage U2 is 800 volts. Thus, the high-voltage DC voltage U2 corresponds to the high-voltage DC voltage of the battery. In the third switching state, both the battery segment 28 and the battery segment 30 are connected to the charging connection 20 via the converter 16, such that the battery segments 28 and 30 are simultaneously charged via the converter 16 with the electrical energy provided by the charging column 22. Furthermore, in the first switching state, in the second switching state and in the third switching state, the contactor 24 is closed, such that the charging connection 20 is electrically connected to the converter 16.

The charging connection 20 is, for example, a charging junction box to which both 400-volt charging columns and 800-volt charging columns can be connected. The battery segments 28 and 30 are also referred to as blocks into which the battery is divided. The respective block has a respective high-voltage DC voltage, which is 400 volts, for example. Thus, the high-voltage DC voltages of the blocks add up to the high-voltage DC voltage of the battery as a whole. Furthermore, the high-voltage DC voltages of the blocks are at least substantially equal. In order to divide the battery into the blocks or to be able to charge the blocks independently or separately from each other, a center tap 32 also referred to as an intermediate voltage tap is provided. The center tap 32 is electrically connected, for example, to a so-called neutral point of the three-stage converter.

The electrical energy or electrical voltage that can be provided by the charging column 22 is also referred to as the charging voltage.

Figure 2:
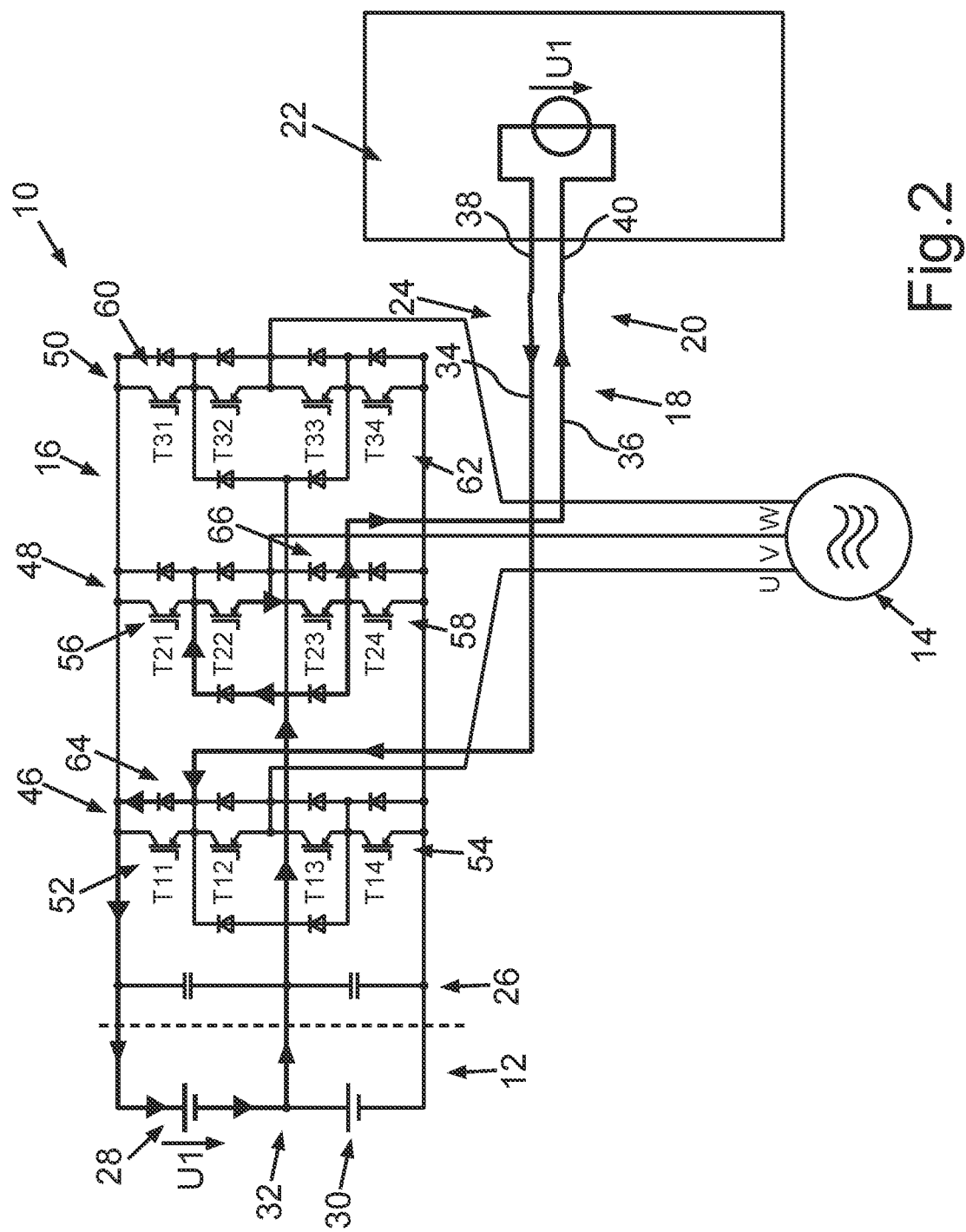
FIG. 2 is a schematic depiction of the circuit arrangement in a first switching state.

By way of example, in order to charge the battery segment 28 by means of the charging column 22 as shown in FIG. 2, the IGBTs T22 and T23 are switched in order to electrically connect, for example, the charging connection 20 and, via this, the charging column 22 to the battery segment 28. As a result, the battery segment 28 can be charged, in particular recharged, with or to 400 volts.

By way of example, as shown in FIG. 3, in order to charge the battery segment 30 by means of the charging column 22, the IGBTs T12 and T13 are switched and thus conductive. According to FIG. 4, the battery can be charged directly via the diodes using the charging column 22, the provided energy of which is 800 volts according to FIG. 4.

By using the additional connections 64 and 66, the lines 34 and 36 can be directly connected to the converter 16, such that the lines 34 and 36 can bypass the phase line of the phases u, v and w. In other words, the lines 34 and 36 need not be connected to the phase line of phases u, v and w, but rather the lines 34 and 36 are electrically connected directly to the converter 16, bypassing the phase lines of phases u, v and w, and thereby to the connections 64 and 66.

The invention claimed is:

1. A circuit arrangement of a motor vehicle, comprising:
a high-voltage battery for storing electrical energy;
an electric machine for driving the motor vehicle;
a converter via which high-voltage direct current (DC) voltage provided by the high-voltage battery is convertible into high-voltage alternating current (AC) voltage for operating the electric machine; and
a charging connection for providing electrical energy for charging the high voltage battery, wherein the charging connection is electrically connectable to an energy source that is external to the motor vehicle and wherein the charging connection has a first line and a second line;
wherein the high-voltage battery has a first battery segment and a second battery segment which are interconnected via a center tap of the high-voltage battery;
wherein the converter is a three-stage converter having:
a first switch unit which is assigned to a first phase of the electric machine;

a second switch unit which is assigned to a second phase of the electric machine; and a third switch unit which is assigned to a third phase of the electric machine wherein the first switch unit has two switch groups connected in series which each have two insulated-gate bipolar transistors (IGBTs) connected in series, wherein a connection is disposed between the IGBTs of one of the two switch groups, which connection is electrically connected directly to the first line of the charging connection;

a first switching state in which at least the first battery segment of the high-voltage battery is connected to the charging connection via the three-stage converter and at least the second battery segment of the high-voltage battery is decoupled from the charging connection by the converter such that the first battery segment can be charged via the three-stage converter with electrical energy provided by the charging connection;

a second switching state in which at least the second battery segment of the high-voltage battery is connected to the charging connection via the three-stage converter and the first battery segment of the high-voltage battery is decoupled from the charging connection by the converter such that the second battery segment can be charged via the three-stage converter with electrical energy provided by the charging connection; and a third switching state in which both the first battery segment and the second battery segment of the high-voltage battery are connected to the charging connection via the three-stage converter such that the first battery segment and the second battery segment can be charged via the three-stage converter with electrical energy provided by the charging connection.

2. The circuit arrangement according to claim 1, wherein, in the first switching state of the converter, the first battery segment can be charged with electrical energy of a voltage of the charging connection provided by the charging connection starting from the charging connection via the first line of the charging connection, the first switch unit of the converter, the first battery segment of the high-voltage battery, the center tap of the high-voltage battery, via the second switch unit of the converter and via the second line of the charging connection.

3. The circuit arrangement according to claim 1, wherein, in the second switching state of the converter, the second battery segment can be charged with electrical energy of a voltage of the charging connection provided by the charging connection starting from the charging connection via the first line of the charging connection, the first switch unit of the converter, the center tap of the high-voltage battery, the second battery segment of the high-voltage battery, via the second switch unit of the converter and via the second line of the charging connection.

4. The circuit arrangement according to claim 1, wherein, in the third switching state of the converter, the first battery segment is connected in series to the second battery segment by a series connection such that the series connection of the first battery segment to the second battery segment can be charged via the converter with electrical energy of a voltage provided by the charging connection starting from the charging connection via the first line of the charging connection, the first switch unit of the converter, the first battery segment of the high-voltage battery, the center tap of the high-voltage battery, the second battery segment of the high-voltage battery, via the second switch unit of the converter and via the second line of the charging connection.

5. The circuit arrangement according to claim 1, wherein no switching state of the converter exists in which the third switch unit of the converter is directly electrically connected to the first line of the charging connection and/or the second line of the charging connection.

6. The circuit arrangement according to claim 1, wherein at least one contactor of the charging connection is disposed in the first line of the charging connection.

7. The circuit arrangement according to claim 1, wherein the second switch unit has two switch groups connected in series which each have two IGBTs connected in series, wherein a connection is disposed between the IGBTs of one of the two switch groups, which connection is electrically connected directly to the second line of the charging connection.

8. The circuit arrangement according to claim 7, wherein at least one contactor of the charging connection is disposed in the second line of the charging connection.

* * * * *